(12) United States Patent
Johnson et al.

(10) Patent No.: US 10,997,144 B2
(45) Date of Patent: May 4, 2021

(54) REDUCING WRITE AMPLIFICATION IN BUFFER TREES

(71) Applicant: VMware, Inc., Palo Alto, CA (US)

(72) Inventors: Robert T Johnson, Palo Alto, CA (US); Ittai Abraham, Tel Aviv (IL); Abhishek Gupta, Sunnyvale, CA (US); Richard P Spillane, Mountain View, CA (US); Sandeep Rangaswamy, Mountain View, CA (US); Jorge Guerra Delgado, Fremont, CA (US); Srinath Premachandran, Fremont, CA (US); Kapil Chowksey, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 194 days.

(21) Appl. No.: 16/029,463

(22) Filed: Jul. 6, 2018

(65) Prior Publication Data
US 2020/0012735 A1 Jan. 9, 2020

(51) Int. Cl.
*G06F 16/00* (2019.01)
*G06F 16/22* (2019.01)
*G06F 16/23* (2019.01)

(52) U.S. Cl.
CPC ...... *G06F 16/2282* (2019.01); *G06F 16/2246* (2019.01); *G06F 16/2379* (2019.01)

(58) Field of Classification Search
CPC ............. G06F 16/2246; G06F 16/2282; G06F 16/2379; G06F 16/24552

USPC ............................... 707/600–899; 711/1–211
See application file for complete search history.

(56) References Cited

U.S. PATENT DOCUMENTS

| | | | | |
|---|---|---|---|---|
| 6,556,578 B1* | 4/2003 | Silberschatz | ........... | H04L 47/10 370/234 |
| 7,509,329 B1* | 3/2009 | Leverett | ................ | G06F 3/0656 |
| 8,671,082 B1* | 3/2014 | Yadav | ..................... | G06F 16/24 707/692 |
| 8,732,406 B1* | 5/2014 | Pase | .................... | G06F 12/0862 711/137 |
| 10,353,884 B2* | 7/2019 | Sharma | ................. | G06F 16/137 |
| 2006/0224551 A1* | 10/2006 | Lariba-Pey | ......... | G06F 16/2456 |
| 2007/0276878 A1* | 11/2007 | Zheng | .................. | G06F 16/125 |
| 2012/0260009 A1* | 10/2012 | Lu | ........................ | G06F 3/0608 710/52 |
| 2016/0041904 A1* | 2/2016 | Bhattacharya | ...... | G06F 16/1847 711/103 |
| 2017/0024161 A1* | 1/2017 | Katiyar | ................. | G06F 3/0689 |
| 2017/0031940 A1* | 2/2017 | Subramanian | ...... | G06F 16/1727 |
| 2018/0089244 A1* | 3/2018 | Velayudhan Pillai | | ...................... G06F 16/221 |
| 2019/0095457 A1* | 3/2019 | Gupta | ................... | G06F 16/185 |

* cited by examiner

*Primary Examiner* — Michelle N Owyang (57) ABSTRACT

A buffer tree structure includes, at each internal node, a buffer having a compacted portion and an uncompacted portion. Insertion of data elements to the buffer tree can occur units called packets. A packet is initially stored in the uncompacted portion of a receiving node's buffer. After a time, packets in the uncompacted portion of a buffer are combined into compacted packets in the compacted portion of the buffer. A buffer-emptying (flush) operation pushes the compacted packets to children nodes.

13 Claims, 10 Drawing Sheets

REDUCING WRITE AMPLIFICATION IN BUFFER TREES

CROSS REFERENCE TO RELATED APPLICATIONS

This application is related to the following commonly owned and concurrently filed applications, the content of each of which is incorporated herein by reference in its entirety for all purposes:

U.S. application Ser. No. 16/134,564, filed Sep. 18 2018, entitled "BALANCING WRITE AMPLIFICATION AND SPACE AMPLIFICATION IN BUFFER TREES"

U.S. application Ser. No. 16/184,861, filed Nov. 8 2018, entitled "BOUNDING COST OF FLUSHES IN BUFFER TREES"

BACKGROUND

A conventional buffer tree is a search tree in which each node has approximately f children and has an associated buffer that can hold approximately B items. New items are inserted into the root's buffer. Whenever a node's buffer exceeds some limits (e.g., on number of items), some of its items are moved to the buffer of one of its children. Items are typically moved from one node's buffer to another in batches. Items within a buffer are typically maintained in sorted order to facilitate searches.

In conventional processing of a conventional buffer tree, every time items are added to a node's buffer, the new items are sorted with the items already present in the buffer and the buffer is rewritten to disk. As a result, items may be written to disk many times while residing in a node's buffer. This effect is sometimes referred to as "write amplification."

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
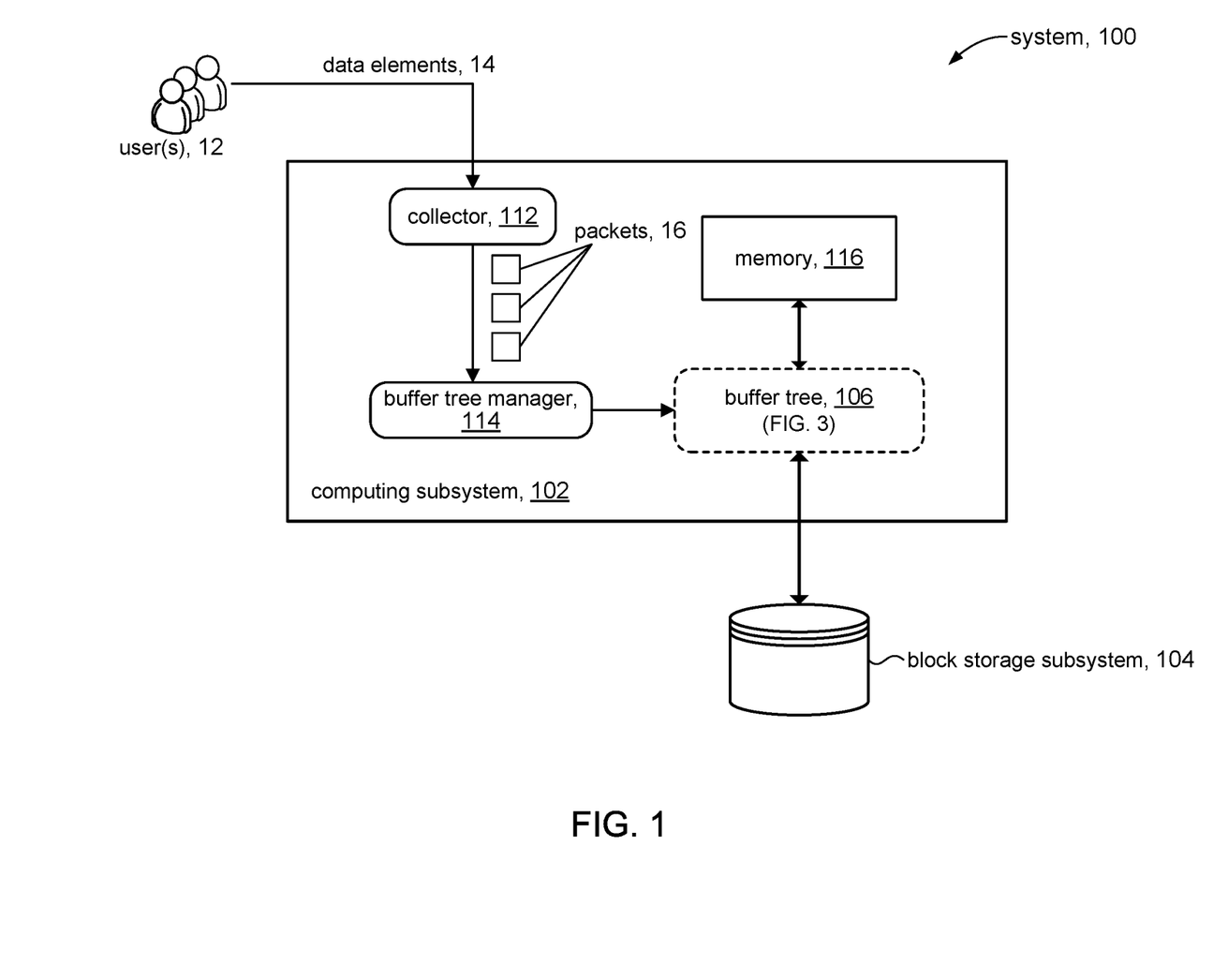
FIG. 1 shows a system level diagram that incorporates a buffer tree in accordance with the present disclosure.

FIG. 1 shows a system 100 in accordance with some embodiments of the present disclosure. In some embodiments, for example, the system 100 can be representative of an information management system such as a database. The system 100 can include a computing subsystem 102 to support data management and data storage in accordance with the present disclosure. The computing subsystem 102 can communicate with a block storage subsystem 104 for mass storage capability. Data can be stored in a buffer tree 106 that is structured in accordance with the present disclosure.

The computing subsystem 102 can include a collector 112 and a buffer tree manager 114. The collector 112 can receive data elements 14 from users 12 and provide them in the form of packets 16 to be processed and stored (inserted) in the buffer tree 106. The buffer tree manager 114 can provide access to read, write, and otherwise manage the buffer tree 106. Details and processing of a buffer tree 106 in accordance with the present disclosure are discussed below. The computing subsystem 102 can further include an internal memory 116 to support the buffer tree 106 along with the block storage subsystem 104.

Figure 2:
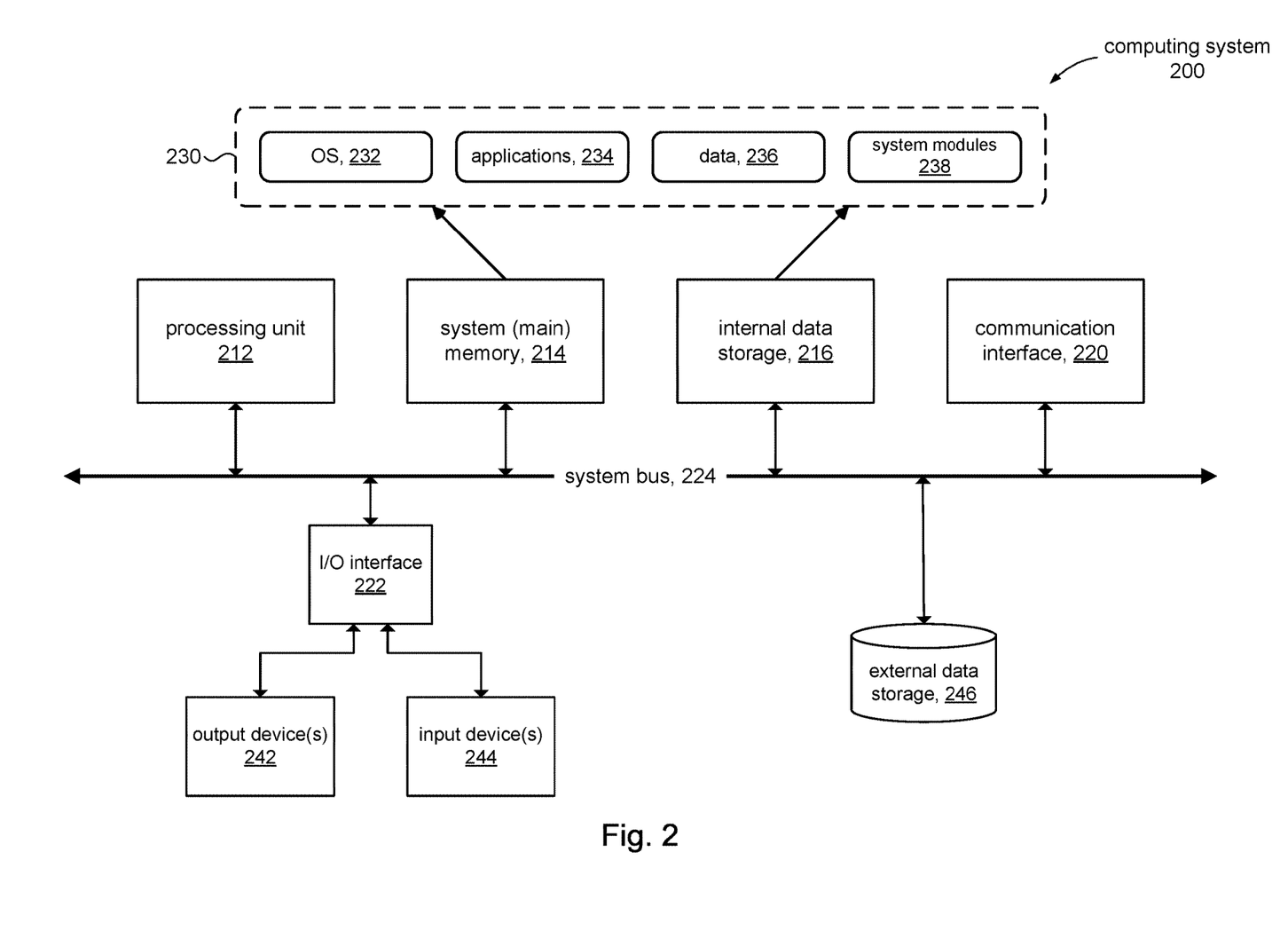
FIG. 2 is a diagram of a computer system in accordance with some embodiments of the present disclosure.

FIG. 2 is a simplified block diagram of an illustrative computing system 200 for implementing one or more of the embodiments described herein (e.g., computing system 102, FIG. 1). The computing system 200 can perform and/or be a means for performing, either alone or in combination with other elements, operations in accordance with the present disclosure. Computing system 200 can also perform and/or be a means for performing any other steps, methods, or processes described herein.

Computing system 200 can include any single- or multi-processor computing device or system capable of executing computer-readable instructions. Examples of computing system 200 include, for example, workstations, laptops, servers, distributed computing systems, and the like. In a basic configuration, computing system 200 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the various disclosed embodiments (e.g., FIGS. 7, 8) of the present disclosure.

System memory 214 (sometimes referred to as main memory) can be any type or form of storage device or storage medium capable of storing data and/or other computer-readable instructions, and comprises volatile memory and/or non-volatile memory. Examples of system memory 214 include any suitable byte-addressable memory, for example, random access memory (RAM), read only memory (ROM), flash memory, or any other similar memory architecture. Although not required, in some embodiments computing system 200 can include both a volatile memory unit (e.g., system memory 214) and a non-volatile storage device (e.g., data storage 216, 246).

In some embodiments, computing system 200 can include one or more components or elements in addition to processing unit 212 and system memory 214. For example, as illustrated in FIG. 2, computing system 200 can include internal data storage 216, a communication interface 220, and an I/O interface 222 interconnected via a system bus 224. System bus 224 can include any type or form of infrastructure capable of facilitating communication between one or more components comprising computing system 200. Examples of system bus 224 include, for example, a communication bus (such as an ISA, PCI, PCIe, or similar bus) and a network.

Internal data storage 216 can comprise non-transitory computer-readable storage media to provide nonvolatile storage of data, data structures, computer-executable instructions, and so forth to operate computing system 200 in accordance with the present disclosure. For instance, the internal data storage 216 can store various program and data modules 230, including for example, operating system 232, one or more application programs 234, program data 236, and other program/system modules 238 to implement structures comprising buffer tree 106 and to support and perform various processing and operations disclosed herein.

Communication interface 220 can include any type or form of communication device or adapter capable of facilitating communication between computing system 200 and one or more additional devices. For example, in some embodiments communication interface 220 can facilitate communication between computing system 200 and a private or public network including additional computing systems. Examples of communication interface 220 include, for example, a wired network interface (such as a network interface card), a wireless network interface (such as a wireless network interface card), a modem, and any other suitable interface.

In some embodiments, communication interface 220 can also represent a host adapter configured to facilitate communication between computing system 200 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 200 can also include at least one output device 242 (e.g., a display) coupled to system bus 224 via I/O interface 222, for example, to provide access to an administrator. The output device 242 can include any type or form of device capable of visual and/or audio presentation of information received from I/O interface 222.

Computing system 200 can also include at least one input device 244 coupled to system bus 224 via I/O interface 222, e.g., for administrator access. Input device 244 can include any type or form of input device capable of providing input, either computer or human generated, to computing system 200. Examples of input device 244 include, for example, a keyboard, a pointing device, a speech recognition device, or any other input device.

Computing system 200 can also include external data storage subsystem 246 coupled to system bus 224. In some embodiments, the external data storage 246 can be accessed via communication interface 220. External data storage 246 can be a storage subsystem comprising a storage area network (SAN), network attached storage (NAS), virtual SAN (VSAN), and the like. External data storage 246 can comprise any type or form of block storage device or medium capable of storing data and/or other computer-readable instructions. For example, external data storage 246 can be a magnetic disk drive (e.g., a so-called hard drive), a solid state drive, a floppy disk drive, a magnetic tape drive, an optical disk drive, a flash drive, or the like. In some embodiments, block storage subsystem 104 in FIG. 1 can comprise external data storage subsystem 246.

Figure 3A:
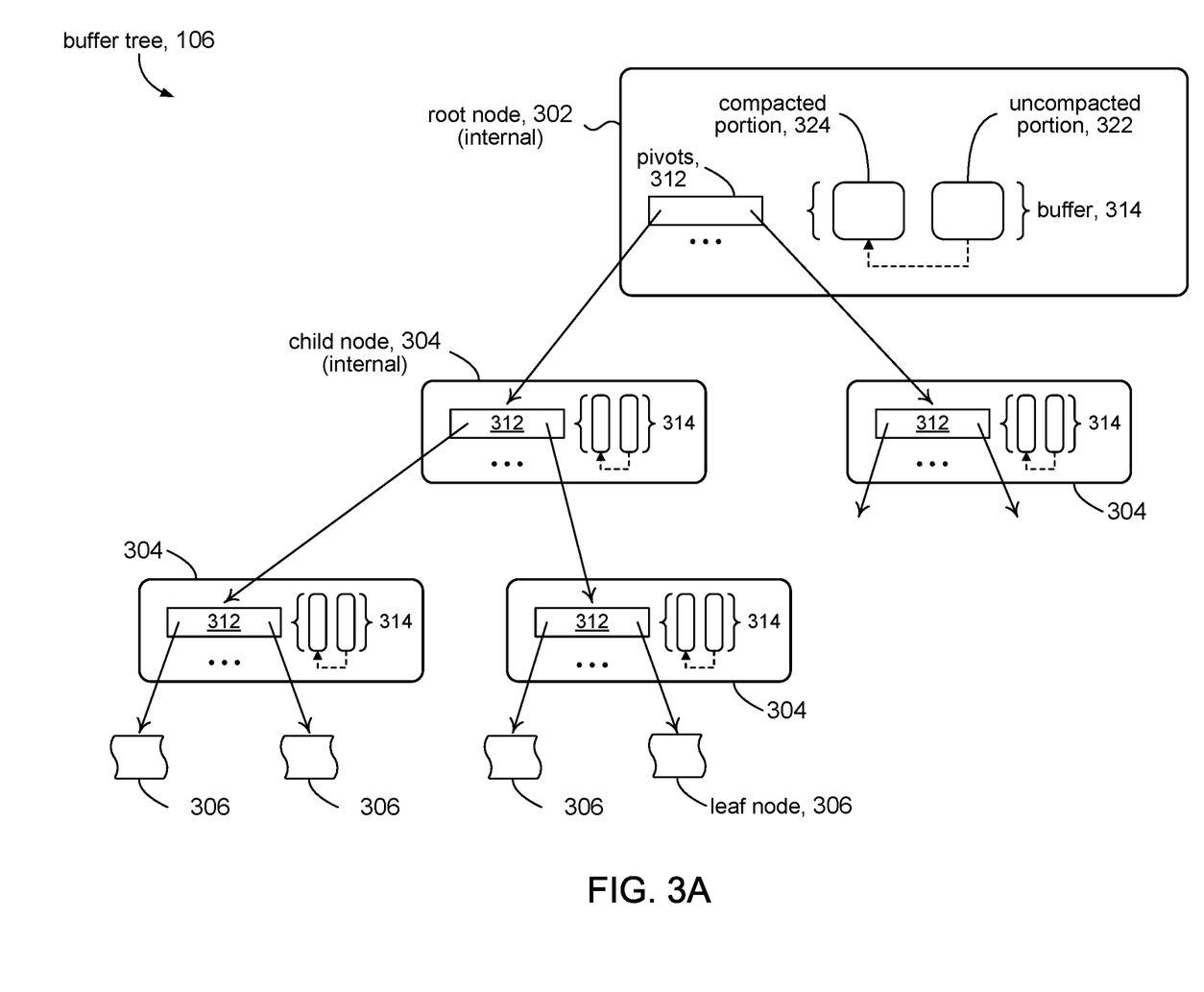
FIG. 3A illustrates some details of a buffer tree of the present disclosure.

FIG. 3A shows some details of buffer tree 106 for storing data elements 14 in accordance with some embodiments of the present disclosure. The buffer tree 106 can include a root node 302 having pivots 312, which point to children nodes 304 of the root node. The root node 302 and children nodes 304 can be referred to as internal nodes. The root node 302 is associated with a corresponding buffer 314 to store data elements 14 received from users 12 of the buffer tree 106. In accordance with the present disclosure, the buffer 314 can comprise an uncompacted portion 322 and a compacted portion 324.

Each child node 304, likewise, includes pivots (pointers) 312 that point to its to children nodes, which can be internal nodes 304 or leaf nodes 306. Each child node 304 is also associated with a corresponding buffer 314 for storing data elements 14. The leaf nodes 306 have no children nodes 304, but rather serve as final destinations in the buffer tree 106 for the data elements 14 as they work they way down from the top of the buffer tree 106, at the root node 302, through the children nodes 304, and to the leaf nodes 306.

Figure 3B:
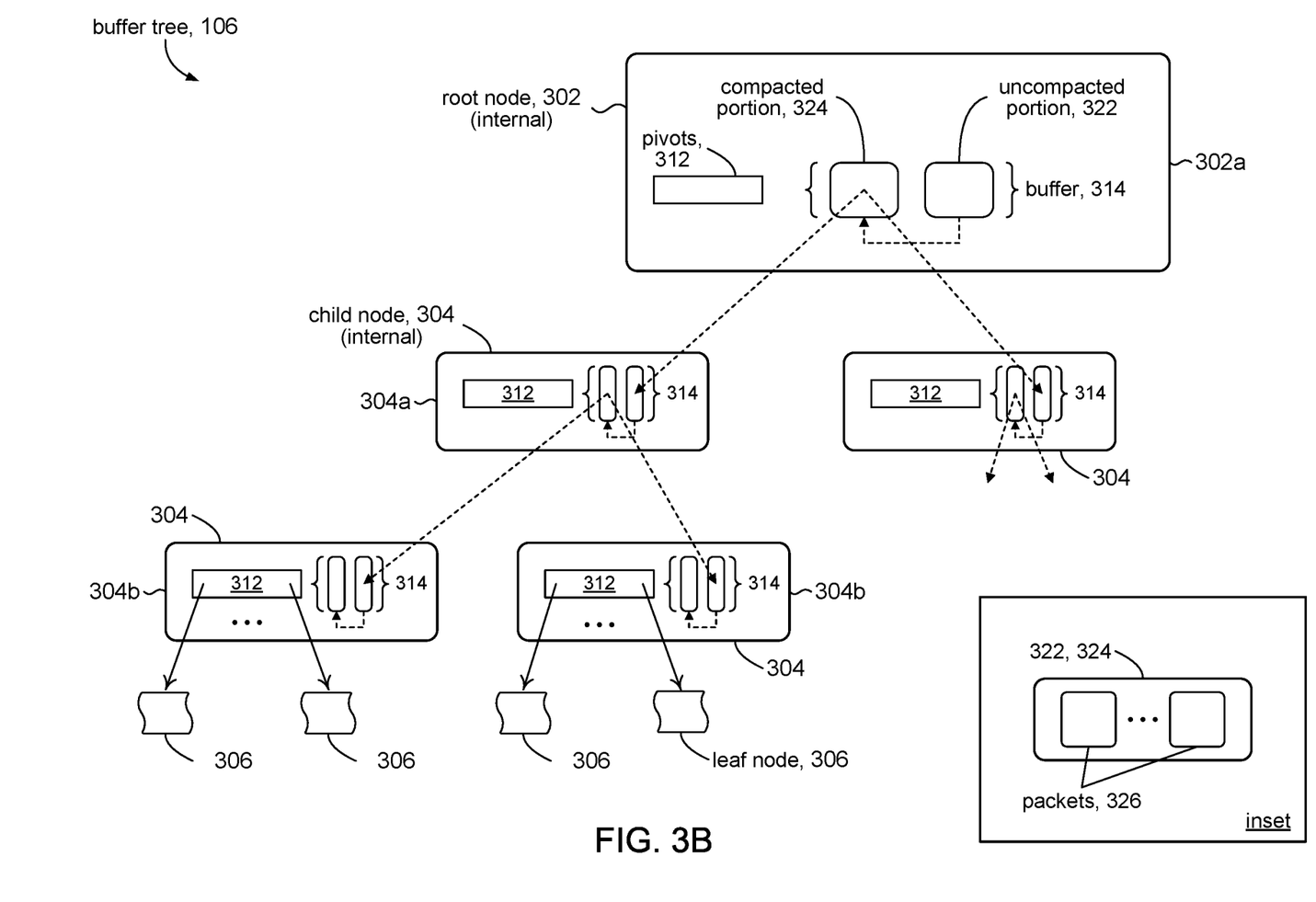
FIG. 3B illustrates data flow in a buffer tree of the present disclosure.

FIG. 3B illustrates some details of data flow in the buffer tree 106 in accordance with the present disclosure, showing the flow of data elements 14 within the buffer 314 of an internal node 302, 304, and between buffers 314 among the internal nodes 302, 304. Some of the arrows between the pivots 312 and the internal nodes 304 illustrated in FIG. 3A are omitted in FIG. 3B to reduce cluttering the figure. With reference to the inset in FIG. 3B, in accordance with some embodiments, the buffer tree 106 can receive and process data elements 14, for insertion into the buffer tree 106, in batches referred to herein as packets 326. As shown in the inset, the uncompacted portion 322 of a buffer 314 can comprise one or more (uncompacted) packets 326 of data elements 14, and likewise the compacted portion 324 of the buffer 314 can comprise one or more (compacted) packets 326 of data elements 14.

Intra-Node Flow.

In accordance with some embodiments, data elements 14 in the buffer 314 of a given internal node (e.g., 302a) can flow between its uncompacted portion 322 and its compacted portion 324. In some embodiments, for example, this intra-node flow of data elements 14 can include storing the data elements 14 contained in one or more packets 326 in the uncompacted portion 322 of the buffer 314 into one or more packets 326 in the compacted portion 324 of the buffer 314 during a process called "data combining," which is discussed in more detail below.

Inter-Node Flow.

In accordance with some embodiments, data elements 14 in the buffer 314 (designated as the "source" buffer) in a given internal node (e.g., 304a) can flow into the buffer(s) 314 (designated as "destination" buffers) in one or more children nodes (e.g., 304b). In some embodiments, for example, this inter-node flow of data elements 14 can include storing one or more packets 326 of data elements 14 in the compacted portion 324 of the source buffer 314 into the uncompacted portions 322 of the destination buffers 314.

Figure 4:
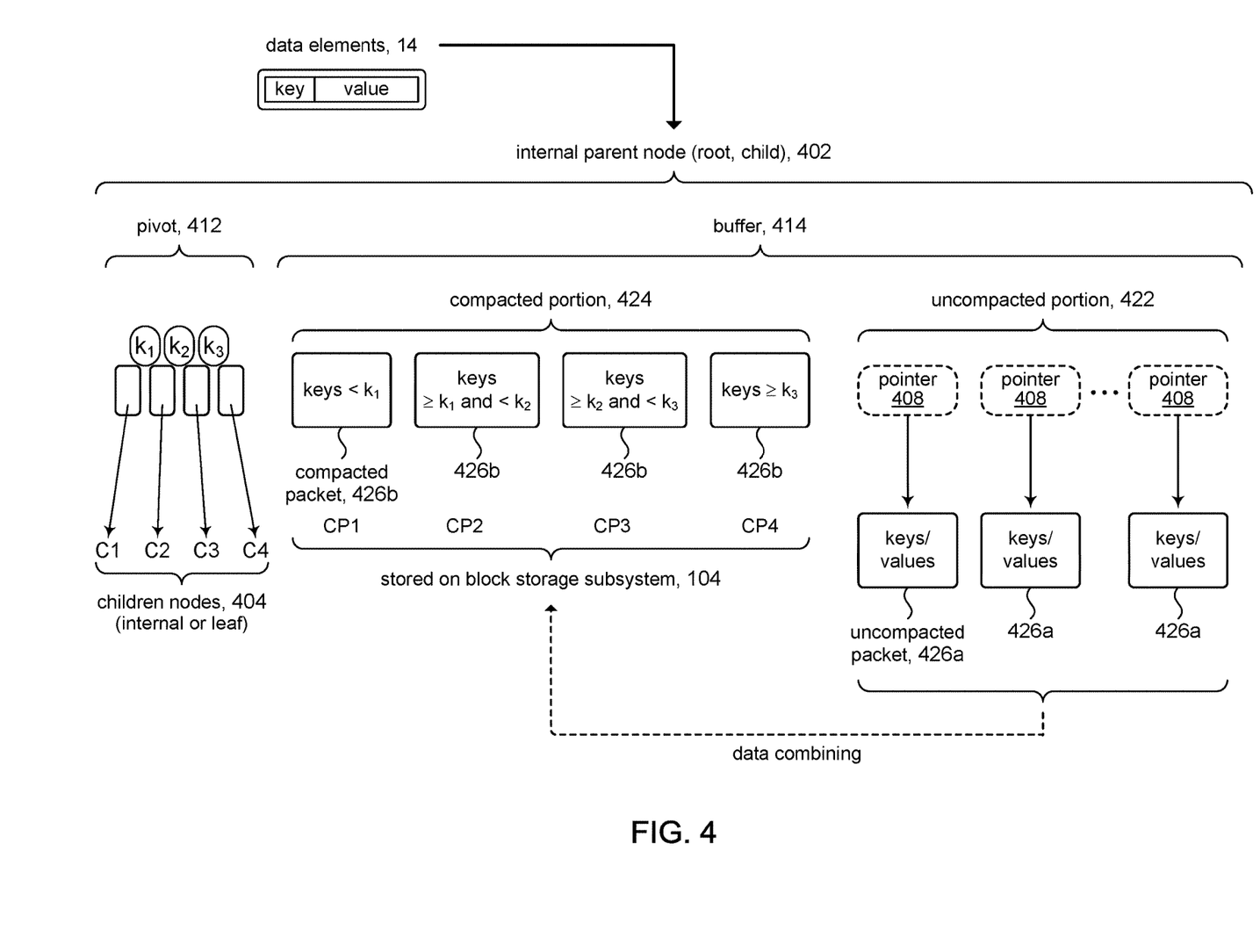
FIG. 4 shows some details of node in a buffer tree of the present disclosure.

FIG. 4 shows additional details of an internal node 402 in accordance with some embodiments of the present disclosure. As noted above, data elements 14 are stored among the nodes of the buffer tree in packets (e.g., 326, FIG. 3B). In some embodiments, a data element 14 can comprise a value and a corresponding key, and can be referred to variously as a data pair, a key-value (k-v) pair, a message, and so on. The value part of the data element 14 represents the information of interest to the user 12 (FIG. 1), which is to be stored in the buffer tree 106. The corresponding key component of the data element can be used as an index into the buffer tree 106 to store that value and later to access the value. The data elements 14 can be stored according to their corresponding keys in the buffers of the internal nodes of the buffer tree 106 or in the leaf nodes.

The internal node example shown in FIG. 4 is for a buffer tree of degree 4. As such, the pivot 412 of the internal node 402 can comprise one to three pivot keys; the example shows the pivot 412 maxed out at three keys, k1, k2, k3. The pivot 412 includes pointers that point to children nodes 404 according to the pivot keys. The children nodes 404 can be the root nodes of sub-trees of the buffer tree 106, or leaf nodes of the buffer tree 106, that store the data elements 14. For example, the child node C1 can store data elements 14 whose corresponding keys are less than k1. Likewise, child node C2 can store data elements 14 whose keys are ≥k1 and <k2. Child node C3 can store data elements 14 whose keys are ≥k2 and <k3, and child node C4 stores data elements 14 whose keys are ≥k3.

In accordance with the present disclosure, the buffer component 414 of the internal node 402 can comprise an uncompacted portion 422 and a compacted portion 424. The uncompacted portion 422 comprises one or more packets referred to as uncompacted packets 426a. In accordance with the present disclosure, the uncompacted packets 426a are stored in the buffer 414 by storing pointers 408 to those uncompacted packets 426a in the uncompacted portion 422 of the buffer 414. The actual location of the data elements 14 comprising the uncompacted packets 426b can be in memory (e.g., main memory 214, FIG. 2) or in data objects on disk (e.g., block storage subsystem 104, FIG. 1). Accordingly, the pointers 408 can be addresses in memory, or addresses or other reference (e.g., file name) to the data objects on disk.

The compacted portion 424 of the buffer 414 comprises one or more packets referred to as compacted packets 426b. In accordance with the present disclosure, compacted packets 426b can be created during a process referred to as data combining. During data combining, data elements 14 from one or more uncompacted packets 426a in a given node are written into one or more compacted packets 426b of that node. In accordance with some embodiments, the compacted packets 426b can be written to and stored on disk (e.g., block storage subsystem 104, FIG. 1). Accordingly, when data elements 14 are written to a compacted packet 426b, the write operation involves a disk I/O operation. This data combining process is representative of the intra-node flow of data elements 14 mentioned above in connection with FIG. 3B.

Figure 5:
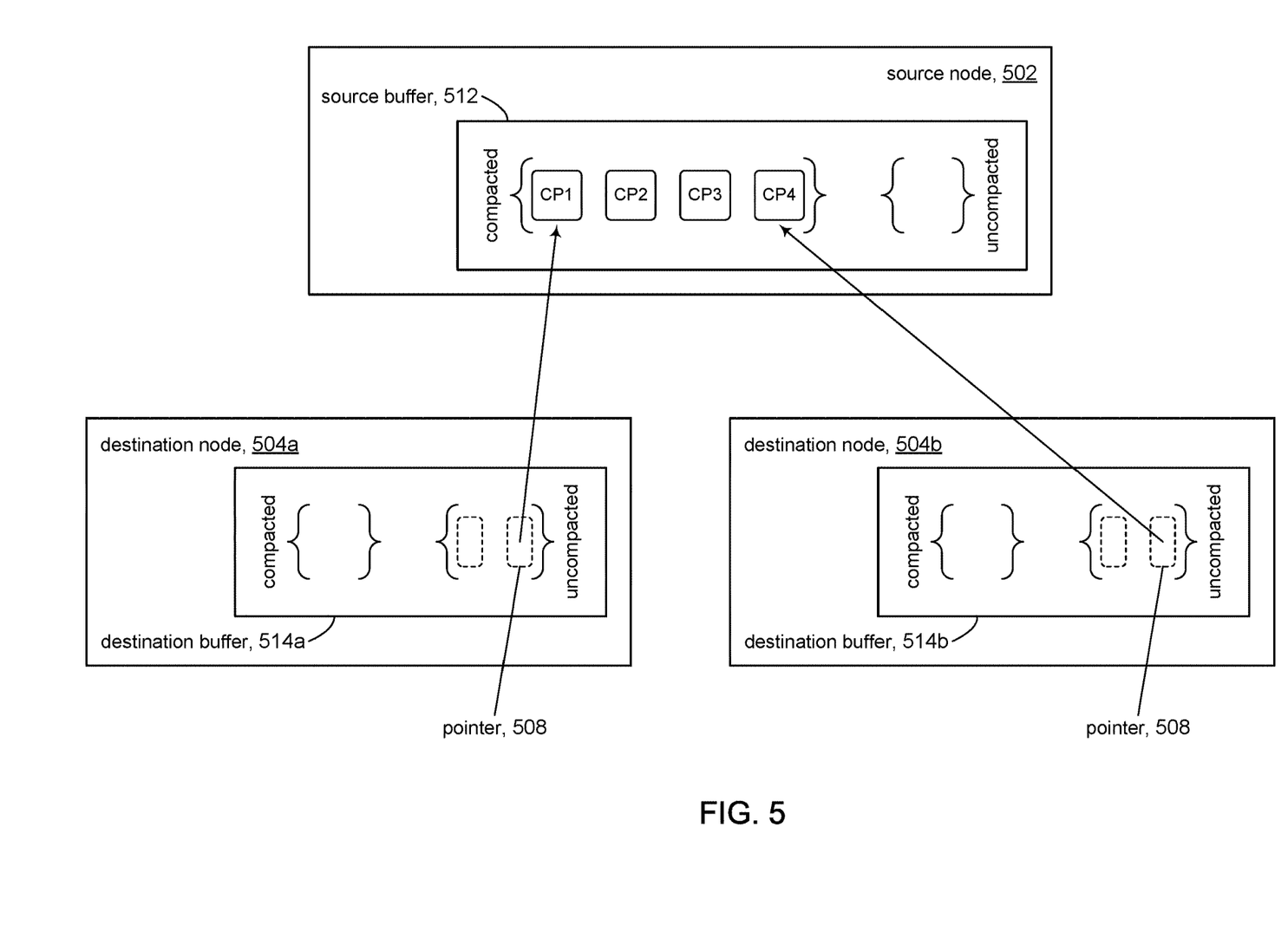
FIG. 5 illustrates the flow of compacted packets in a buffer tree of the present disclosure.

FIG. 5 shows an example to illustrate the inter-node flow of data elements 14 mentioned above in connection with FIG. 3B. The flow of data elements 14 between nodes can include storing one or more of compacted packets CP1, CP2, CP3, CP4 in the compacted portion of a source buffer 512 in a source node 502 into one or more destination nodes 504a, 504b as uncompacted packets. In some embodiments according to the present disclosure, the operation can amount to the storing of pointers 508 to the compacted packets CP1, CP2, CP3, CP4 in the source buffer 512 into the uncompacted portions of destination buffers (e.g., 514a, 514b) in destination nodes (e.g., 504a, 504b). As explained further below, each compacted packet CP1, CP2, CP3, CP4 can correspond to a child of the source node 502. FIG. 5 shows that CP1 corresponds to child node 504a and CP4 corresponds to child node 504b. In accordance with the present disclosure, a pointer to CP1 can be stored in the uncompacted portion of destination buffer 514a, and likewise CP4 can be stored in the uncompacted portion of destination buffer 514b. Pointers to compacted packets CP2 and CP3 are stored in other children (not shown) of source node 502. Depending on the actual storage locations of the compacted packets (main memory, storage device, etc.), the pointers 508 can be memory locations, storage addresses, etc.

Figure 6:
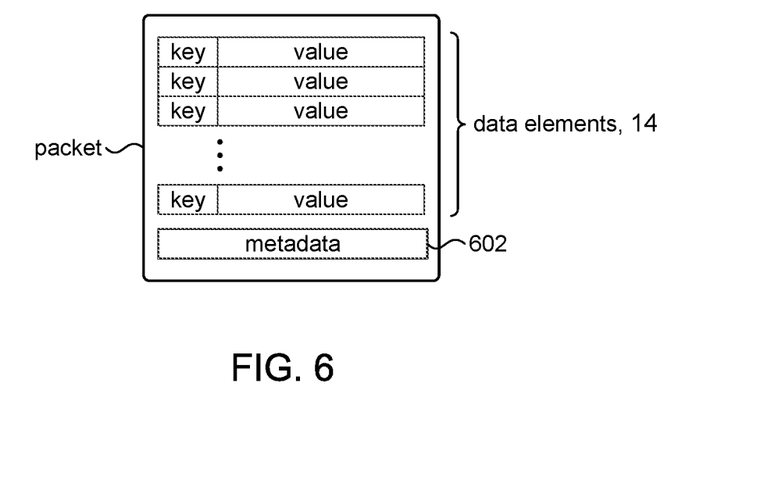
FIG. 6 shows some detail of a packet of data elements.

FIG. 6 illustrates additional details of a packet (e.g., 16, FIG. 1, 326, FIG. 3B) of data elements 14. The data elements 14 can be stored as a list. The list can be in sorted order, in the order that collector 112 (FIG. 1) received the data elements 14, and so on. In some embodiments, a packet can include metadata 602 for tracking and managing its constituent data elements 14.

Figure 7:
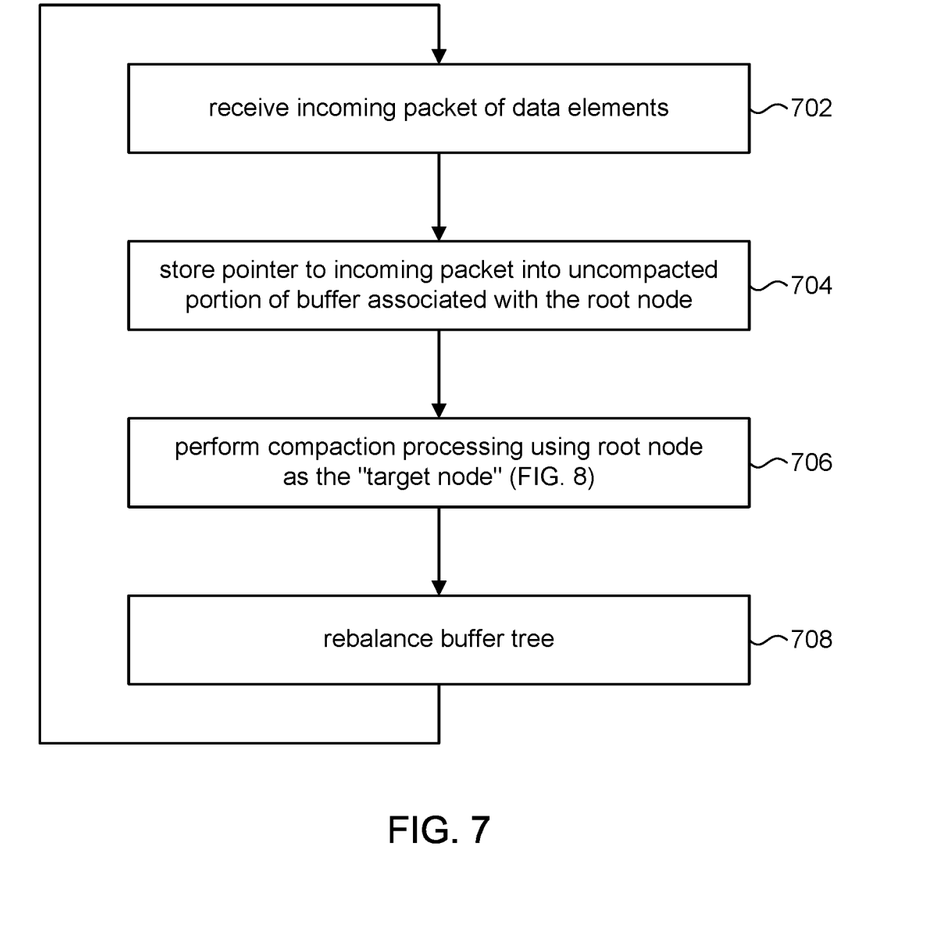
FIG. 7 is a high level flow of a process for insertion of data elements in a buffer tree of the present disclosure.

Referring to FIG. 7, the discussion will now turn to a high level description of processing in the buffer tree manager (e.g., 114, FIG. 1) for storing (inserting) data elements (e.g., 14) in a buffer tree (e.g., 106) in accordance with the present disclosure. In some embodiments, for example, the buffer tree manager can include computer executable program code, which when executed by a computer system (e.g., 200, FIG. 2), can cause the computer system to perform processing in accordance with FIG. 7. The flow of operations performed by the computer system is not necessarily limited to the order of operations shown.

At block 702, the buffer tree manager can receive data elements to be stored in the buffer tree. In some embodiments, the buffer tree manager can receive packets (e.g., 16, FIG. 1) of data elements from a collector (e.g., 112). For example, users can issue write operations to the collector to store data elements (e.g., key-value pairs) to the buffer tree. The collector can gather batches of data elements and send them to the buffer tree manager as packets of data elements. For example, the collector can simply receive some number N of data elements from the users. When N data elements have been collected, the collector can create a packet of received data elements and send it off to the buffer tree manager. In some embodiments, the collector can sort the data elements in the packet before sending it to the buffer tree manager; for example, using the key components of the data elements as the sort key. In other embodiments, the data elements in the packets can remain unsorted, for example, in the order they were received from the users.

At block 704, the buffer tree manager can store a packet received from the collector into the root node of the buffer tree as an uncompacted packet (e.g., 426a, FIG. 4). In accordance with the present disclosure, this operation can amount to the buffer tree manager storing a pointer (e.g., 408) to the received packet in the uncompacted portion (e.g., 422) of the buffer in the root node. In some embodiments, for example, the collector can create a packet by allocating memory from main memory and storing data elements into the allocated memory. The pointer that is stored in the uncompacted portion of the buffer can be the address of the beginning of that allocated memory. It is noted that this operation does not involve I/O with a disk (e.g., block storage subsystem 104, FIG. 1), but rather only the manipulation of a pointer.

At block 706, the buffer tree manager can perform compaction processing on the root node. In accordance with the present disclosure, compaction processing is a process by which data elements are propagate down the buffer tree. Details of this operation are discussed in connection with FIG. 8. Compaction processing is conditionally performed, as will be discussed below in FIG. 8.

At block 708, the buffer tree manager can rebalance the buffer tree. Embodiments in accordance with the present disclosure can be combined with most techniques for rebalancing in a buffer tree. Although the rebalancing operation is shown as being performed toward the end of processing, it will be appreciated that in other embodiments, the rebalancing operation can be performed at other times during the process. In some embodiments, the processing of FIG. 7 may omit a rebalancing operation. The buffer tree manager can return to block 702 to receive and process the next incoming packet from the collector.

Figure 8:
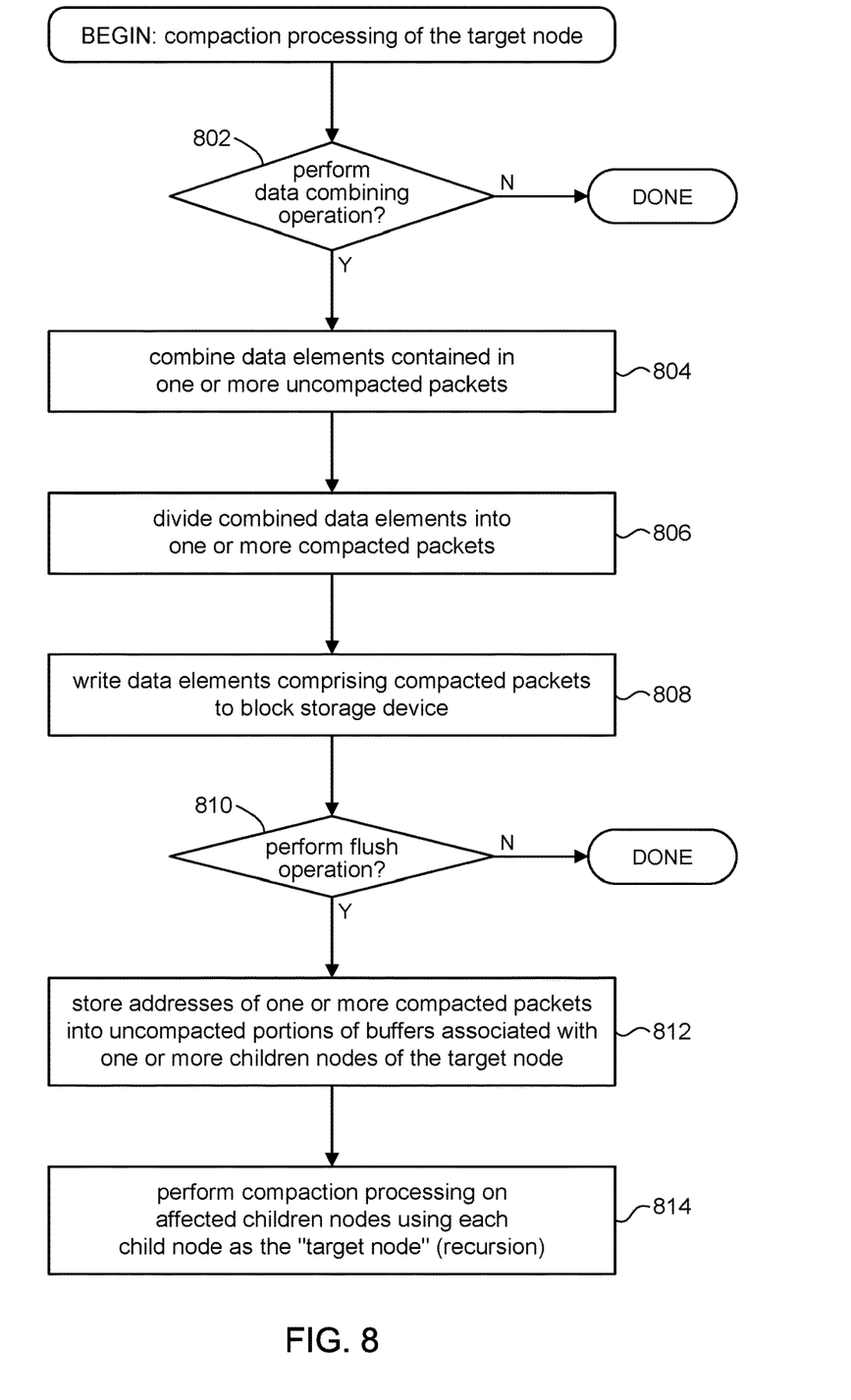
FIG. 8 is a high level flow of a process for processing packets of data elements (packet compaction) in a buffer tree of the present disclosure.

Referring to FIG. 8, the discussion will now turn to a high level description of processing in the buffer tree manager to conduct compaction processing in accordance with the present disclosure. In some embodiments, for example, the buffer tree manager can include computer executable program code, which when executed by a computer system (e.g., 200, FIG. 2), can cause the computer system to perform the processing in accordance with FIG. 8. The flow of operations performed by the computer system is not necessarily limited to the order of operations shown.

Compaction processing is performed on a target node as the "target" of the compaction operation. In block 706 of FIG. 7, for example, compaction processing is invoked using the root node as the target node. The following description of FIG. 8 can therefore be read where the target node is the root node. It is noted, however, that compaction processing can also be invoked using children of the root node as the target nodes. In some embodiments, for example, compaction processing can be recursive in which processing of a target node can result in compaction processing of children of the target node. This, in turn, can invoke compaction processing of children of the children of the target node, and so on. This aspect of the embodiment is discussed below.

At block 802, the buffer tree manager can make a determination whether to perform a data combining operation, or not, on the target node. As explained above, data combining is a process by which data elements stored in one or more uncompacted packets in the uncompacted portion of the buffer of the target node are stored into one or more compacted packets in the compacted portion of the buffer. In some embodiments, the criterion for whether to perform data combining can be based on the size of the uncompacted portion of the buffer. For example, if the total of the sizes of the uncompacted packets exceeds a predetermined value, B, then data combining can be performed. In some embodiments, for instance, the predetermined value B can be based on a maximum size of the buffer. Although the particular value of B is not relevant to the present disclosure, in some instances the buffer size can be a multiple of the block size of the block storage subsystem 104 (FIG. 1); e.g., block sizes can be 512 bytes, 4 KB, etc. Compaction processing of the target node is not performed (N branch) if the buffer tree manager determines that data combining is not required. Otherwise, compaction processing is performed and processing can continue with block 804 (Y branch).

Figure 9:
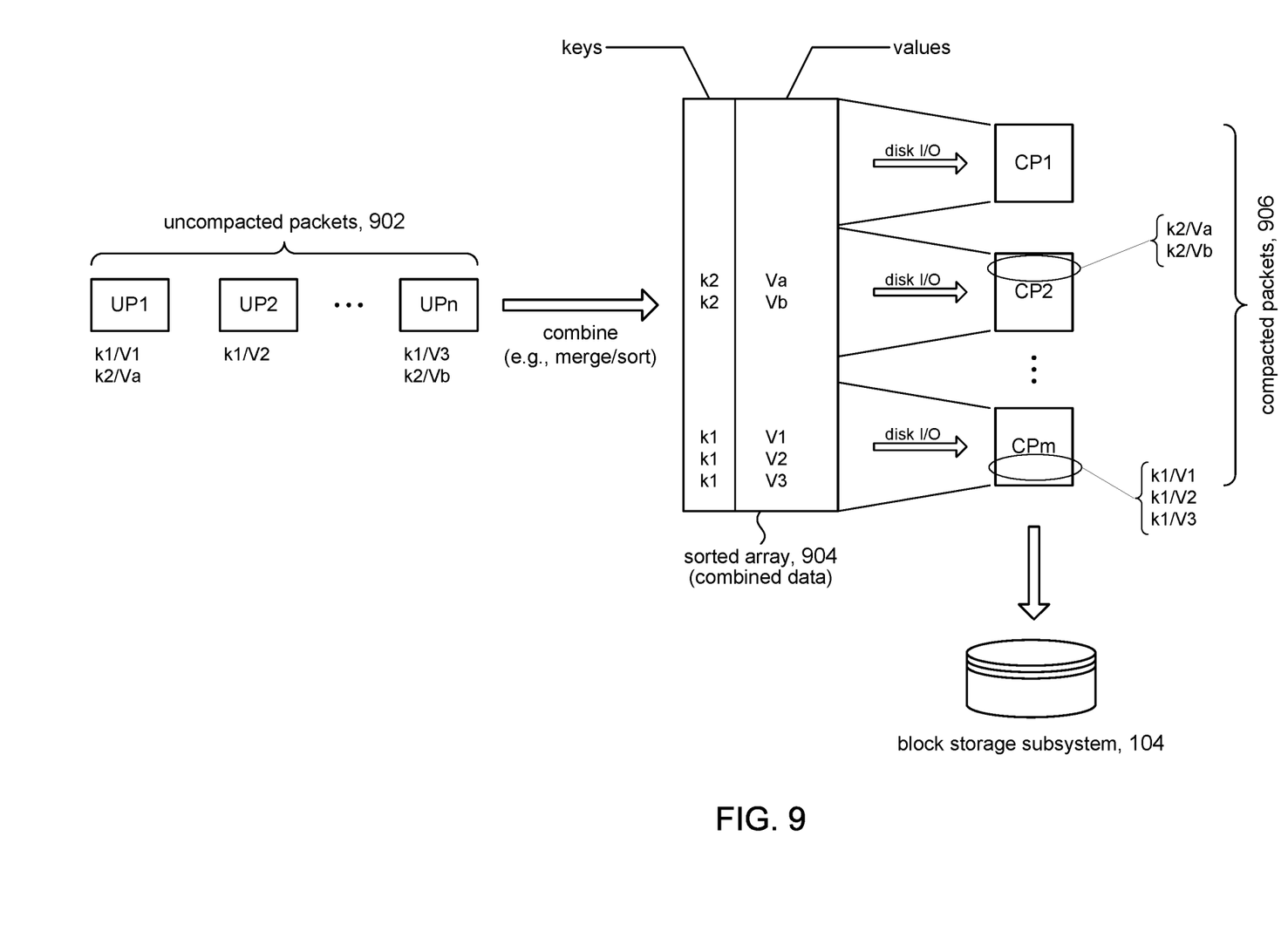
FIG. 9 illustrates some details for combining data elements from uncompacted packets in accordance with the present disclosure.

At block 804, the buffer tree manager can begin the data combining operation by combining the data elements contained in one or more of the uncompacted packets in the uncompacted portion of the buffer of the target node. FIG. 9 illustrates an example of the data combining operation. In some embodiments, the data combining operation can involve all the uncompacted packets 902 in the uncompacted portion of a buffer. In other embodiments, the data combining operation can involve a subset of the uncompacted packets 902. FIG. 9 shows that data elements with the same key can appear in different uncompacted packets 902. For example, a data element with key k1 appears in uncompacted packets UP1, UP2, and UPn, and a data element with key k2 appears in UP1 and UPn.

In some embodiments, each of the uncompacted packets 902 can be stored as a sorted array. Combining the data elements in the uncompacted packets 902 can include a merge/sort operation. A merge/sort operation can merge the data elements from the uncompacted packets 902 into an array 904, sorted according to their corresponding keys. Data elements having the same key will be grouped together in the array 904, and can be sorted according to secondary criteria other than their key. In some embodiments, for example, data elements having the same key can be sorted according to their time of entry in the buffer tree.

Returning to FIG. 8, at block 806, the buffer tree manager can divide the combined data elements, stored in array 904, into one or more compacted packets in the compacted portion of the buffer. In accordance with the present disclosure, the buffer tree manager can define a set of compacted packets according to the current set of keys in the pivot of the target node. For example, each compacted packet can correspond to a child of the target node and in particular to the key range associated with that child. This aspect of the present disclosure is illustrated in the example of FIG. 4. The pivot 412 shows the set of keys: k1, k2, k3. The corresponding children nodes C1, C2, C3, C4 are keyed according to the following key ranges: keys in the range <k1, keys in the range ≥k1 and <k2, keys in the range ≥k2 and <k3, and keys in the range ≥k3. A compacted packet 426b corresponds with each child node C1, C2, C3, C4 and key range. Accordingly, the buffer tree manager can divide the combined data elements among the compacted packets 426b according to their corresponding key ranges. Thus, in our example in FIG. 4, the buffer tree manager would store data elements having keys in the range <k1 in compacted packet CP1, data elements having keys in the range ≥k1 and <k2 in compacted packet CP2, data elements having keys in the range ≥k2 and <k3 in CP3, and data elements having keys in the range ≥k3 in CP4.

Turning to FIGS. 8 and 9 and continuing with the discussion of block 806, since the data elements in the compacted packets 906 are sorted according to their keys, data elements that are identified by a given key appear in, or are unique to, one of the compacted packets 906, unlike in the uncompacted packets 902 where data elements identified by a given key can appear in multiple uncompacted packets 902. FIG. 9 illustrates this example. A data element (k1/)

appears in uncompacted packet UP1. Another data element (k1/V2) appears in UP2 and another (k1/V3) in UP3. The k1 key indicates they are the same data element, but with different values V1, V2, V3 (e.g., written out at different times and/or by different users). FIG. 9 further shows that the data element k2/Va and k2/Vb appear in uncompacted packets UP1 and UP3, respectively. Accordingly, uncompacted packets 902 can have overlapping key ranges. After the buffer tree manager divides up the combined data elements, however, we see that all the data elements with key k1 have been merged and sorted, and stored only in compacted packet, namely CPm, and likewise all the data elements with key k2 have been merged and sorted and stored only in compacted packet, namely CP2; in other words, compacted packets 906 do not have overlapping keys.

Continuing with FIG. 8, at block 808, the buffer tree manager can write the compacted packets to a suitable block storage device. This action incurs a write (I/O) operation to the block storage device. The data combining operation, invoked at block 802, can be deemed complete at this point.

At block 810, the buffer tree manager can determine whether to perform a flush (buffer-emptying) operation on the target node. In some embodiments, a flush operation can be performed whenever a data combining operation is performed. In other embodiments, the buffer tree manager can use other suitable criteria to make the determination whether to perform a flush operation on the target node; this aspect of the present disclosure is discussed below. Accordingly, the compaction processing of the target node can be deemed complete (N branch) if the buffer tree manager determines a flush of the target node is not called for. Otherwise, compaction processing of the target node can continue to block 812 (Y branch).

At block 812, the buffer tree manager can perform a flush operation on the target node, which includes pushing one or more of the compacted packets in the target node to corresponding one's of the target node's children. In some embodiments of the present disclosure, this operation can amount to storing the addresses of the compacted packets to their corresponding children nodes. FIG. 5 illustrates this aspect of the present disclosure. Suppose a flush operation is performed source node 502, and that the keys stored in compacted packet CP1 fall within the key range of destination node 504a. A flush operation in accordance with some embodiments, includes pushing the compacted packet CP1 to the uncompacted portion of buffer 514a of the destination node 504a, as an uncompacted packet, by storing a pointer 508 to CP1 in the uncompacted portion of buffer 514a. Likewise for compacted packet CP4, if the keys stored in CP4 fall within the key range of destination node 504b, then CP4 can be pushed to the uncompacted portion of buffer 514b of node 504b, as an uncompacted packet, by storing a pointer 508 to CP4 in the uncompacted portion of buffer 514b.

Compaction processing of the target node can be deemed complete when the flushing operation is done. In some embodiments, compaction processing can continue recursively with one or more children of the target node that receive a compacted packet. Accordingly, at block 814, the buffer tree manager can recursively invoke compaction processing on children of target node that receive a compacted packet, where that child becomes the target node for the subsequent compaction process. The decision blocks 802 and 810 represent stopping criteria for the recursion, allowing the recursive process to "unwind." Other stopping criteria can be included; for example, a test (not shown) whether the target node is a leaf node would ensure that the process stops at the leaf nodes of the buffer tree.

As mentioned above in block 804, in some embodiments the uncompacted packets 902 can be stored as sorted arrays. In other embodiments (not shown), each of the uncompacted packets 902 can be stored as a search tree (e.g., a B-tree). The target node can include a set of pointers to the root nodes of the search trees. The data combining operation in block 804 can involve constructing a single "combined" search tree containing all the elements in the individual search trees. The divide operation in block 806 can include constructing new search trees by inserting elements from the combined search tree and updating the combined search tree to no longer contain those elements.

In still other embodiments (not shown), the target node can store uncompacted packets in a single contiguous region of disk. For example, each node (e.g., 302, 304, FIG. 3A) can be allocated a certain amount of disk space for the buffer 314. Uncompacted packets can be stored as sorted arrays in the buffer. The combine operation 804 can sort the arrays into a single array and store the result in unused space in the buffer 314. The flush operation in block 812 can copy a packet from the target node into unused space in the buffer of a child node.

Figure 10:
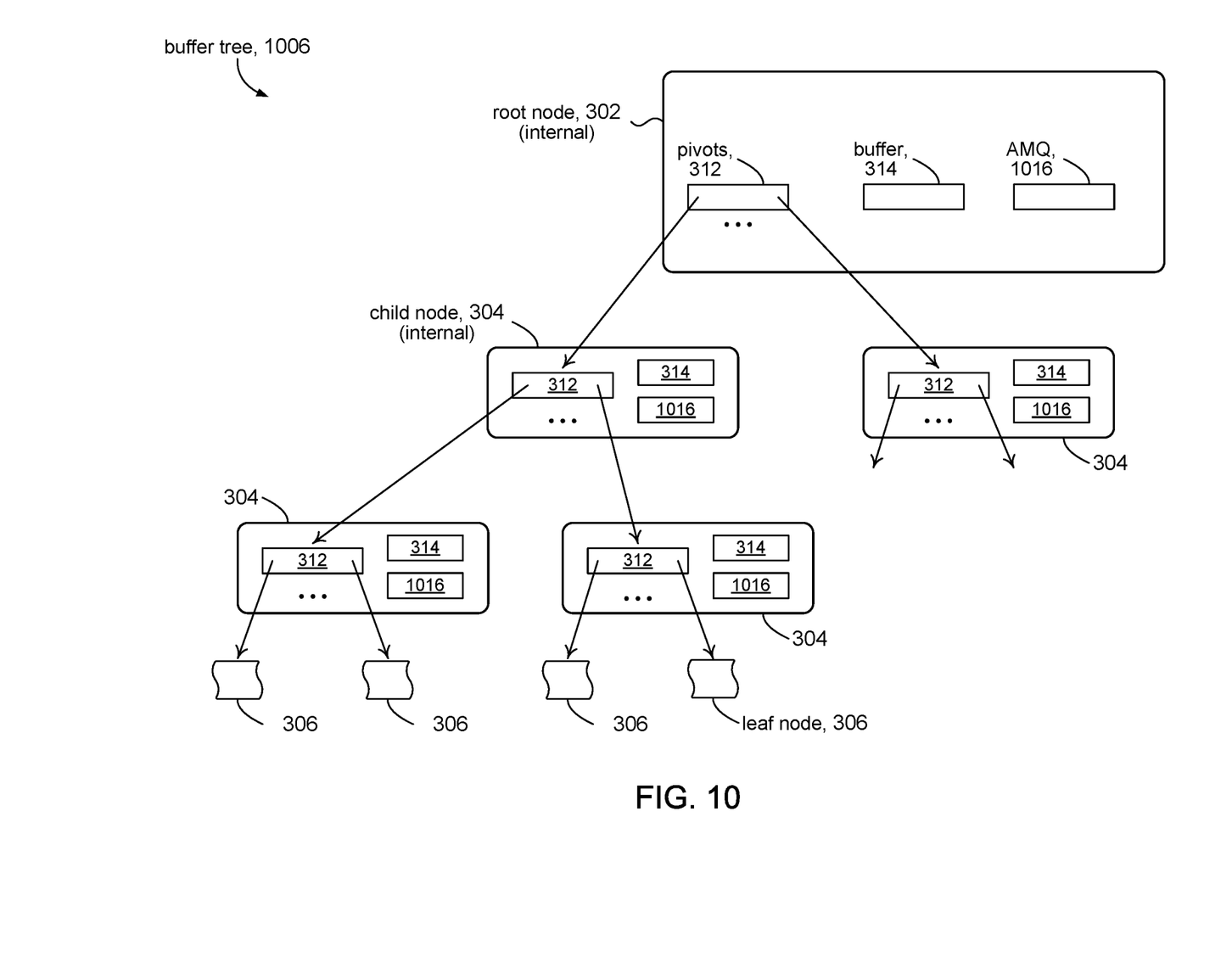
FIG. 10 illustrates the use of an approximate membership query structure in accordance with some embodiments.

Referring to FIG. 10, in some embodiments a buffer tree 1006 in accordance with the present disclosure can include an approximate membership query (AMQ) structure 1016 in each of its nodes 302, 304. In some embodiments, the AMQ 1016 can be Bloom filter, although any suitable AMQ structure can be used, for example, quotient filter and cuckoo filter.

A query in buffer tree 1006 can require searching several of the packets in a node to find the queried item, and in a worst case situation can result in searching every packet in the node. In accordance with some embodiments, the AMQ 1016 can reduce the search cost. In some embodiments for example, processing a query include using the AMQ 1016 to check whether the queried item might be in a packet, and only examines those packets that the AMQ indicates might contain the queried item. When moving a packet from one node to another, we move its corresponding AMQ, as well.

In some embodiments, each packet has a corresponding AMQ 1016. When a packet it created, a corresponding AMQ 1016 is created. A query can be processed by checking each AMQ, and search the corresponding packet when the AMQ indicates the queried item might be contain in that packet.

In other embodiments, each node can maintain a single AMQ 1016, where the AMQ acts as a key-value store, mapping keys to bit-maps indicating which of the packets in that node might contain the queried item. This enables the query operation to perform only a single AMQ query per node.

CONCLUSION AND OBSERVATIONS

Buffers in a conventional buffer tree are typically always maintained in sorted order. Thus, when data elements are added at the root node of a conventional buffer tree, the incoming data elements are sorted with data elements already in the root's buffer, and the updated root buffer is rewritten to disk. Likewise, when data elements are flushed from the root node to its children nodes, the data elements in the children buffer are immediately sorted and rewritten to disk.

By comparison, when a buffer tree of the present disclosure is processed in accordance with the present disclosure, the cost of writing to disk (e.g., block storage subsystem

104, FIG. 1) can be delayed. An incoming packet of data elements in a node can be "stored" in the receiving node by storing a pointer to (or an address of) that packet into the uncompacted portion of the receiving node's buffer; this operation does not involve writing the data elements to disk. For example, at block 704 (FIG. 7), incoming packets are stored in the root buffer by storing a pointer (an address) to the incoming packet; likewise at block 812 (FIG. 8) where compacted packets are stored in the buffers of the children nodes.

A write to disk does not occur until the data combining operation is performed (e.g., blocks 804-808) in which data elements in the uncompacted portion of the node's buffer are combined and divided into one or more compacted packets in the compacted portion of the node's buffer. Thus, a node can continue receiving and storing packets into its uncompacted portion of the buffer until an event triggers a data combining operation, for example, such as when the size of the uncompacted portion of the buffer reaches a maximum value.

Storing packets of data elements in a node involves storing pointers to the incoming packets. The cost of a write I/O operation to disk is incurred only when a data combining operation is performed. Accordingly, a computer system that supports a buffer tree of the present disclosure and provides processing in accordance with the present disclosure can significantly reduce the amount of write I/O that is incurred when storing data elements to the buffer tree, thus improving performance in the computer system.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
providing a buffer tree in a memory of a computer, the buffer tree comprising a plurality of nodes including a root node and a plurality of child nodes descending from the root node, wherein each of the plurality of nodes comprising a respective buffer, wherein the respective buffer comprising a respective compacted portion and a respective uncompacted portion, wherein the respective uncompacted portion having stored therein one or more respective pointers, wherein each pointer of the one or more respective pointers is pointing to a respective data;
receiving, by the computer, a pointer that points to a data;
adding, by the computer, the received pointer to the one or more respective pointers in the uncompacted portion of the buffer of the root node to produce a plurality of pointers; and
when an amount of data pointed to by the plurality of pointers in the uncompacted portion of the buffer of the root node exceeds a predetermined limit, the computer:
accessing the data pointed to by the plurality of pointers in the uncompacted portion of the buffer of the root node;
combining the accessed data; and
storing the combined data among one or more compacted packets in the compacted portion of the buffer in the root node, including writing the one or more compacted packets to a data storage device separate from the memory of the computer.

2. The method of claim 1, further comprising flushing at least one of the one or more compacted packets to a child node of the root node by storing a pointer to at least one of the one or more compacted packets in the root node into an uncompacted portion of a buffer of the child node.

3. The method of claim 2, wherein storing a pointer to the compacted packet in an uncompacted portion of a buffer of the child node does not include writing data comprising the compacted packet to the data storage device.

4. The method of claim 1, wherein the combining comprises:
producing a sorted list of the data pointed to by the plurality of pointers that is sorted according to keys associated with the data; and dividing the sorted list into the one or more compacted packets according to key ranges associated with children of the root node.

5. The method of claim 1, wherein the data pointed to by the received pointer comprises a plurality of data elements, wherein each data element comprises a value and an associated key that is used to index the value, wherein a key in a first data element in a first uncompacted packet and is also with a key in a second data element in a second uncompacted packet, wherein keys associated with data elements in a compacted packet are unique to that compacted packet.

6. The method of claim 1, wherein the predetermined limit is a total size of the buffer of the root node.

7. A non-transitory computer-readable storage medium having stored thereon computer executable instructions, which when executed by a computer device, cause the computer device to:
provide a buffer tree in a memory of the computer device, the buffer tree comprising a plurality of nodes including a root node and a plurality of child nodes descending from the root node, wherein each of the plurality of nodes comprising a respective buffer, wherein the respective buffer comprising a respective compacted portion and a respective uncompacted portion, wherein the respective uncompacted portion having stored therein one or more respective pointers, wherein each pointer of the one or more respective pointers is pointing to a respective data;
receive a pointer that points to a data;
add the received pointer to the one or more respective pointers in the uncompacted portion of the buffer of the root node to produce a plurality of pointers; and
when an amount of data represented by the plurality of pointers in the uncompacted portion of the buffer of the root node exceeds a predetermined limit, then:
accessing the data pointed to by the plurality of pointers in the uncompacted portion of the buffer of the root node;
combining the accessed data; and
storing the combined data among one or more compacted packets in the compacted portion of the buffer in the root node, including writing the one or more compacted packets to a data storage device separate from the memory of the computer device.

8. The non-transitory computer-readable storage medium of claim 7, wherein the computer executable instructions, which when executed by the computer device, further cause the computer device to flush at least one of the one or more compacted packets to a child node of the root node by storing a pointer to at least one of the one or more compacted packets in the root node into an uncompacted portion of a buffer of the child node.

9. The non-transitory computer-readable storage medium of claim 8, wherein the computer device stores a pointer to the compacted packet in an uncompacted portion of a buffer of the child node without writing the data elements comprising the compacted packet to the data storage device.

10. The non-transitory computer-readable storage medium of claim 7, wherein the computer executable instructions, which when executed by the computer device, further cause the computer device to:
produce a sorted list of the data pointed to by the plurality of pointers that is sorted according to keys associated with the data; and
divide the sorted list into the one or more compacted packets according to key ranges associated with children of the root node.

11. An apparatus comprising:
one or more computer processors; and
a computer-readable storage medium comprising instructions for controlling the one or more computer processors to be operable to:
provide a buffer tree in a memory of the apparatus, the buffer tree comprising a plurality of nodes including a root node and a plurality of child nodes descending from the root node, wherein each of the plurality of nodes comprising a respective buffer, wherein the respective buffer comprising a respective compacted portion and a respective uncompacted portion, wherein the respective uncompacted portion having stored therein one or more respective pointers, wherein each pointer of the one or more respective pointers is pointing to a respective data;
receive a pointer that points to a data;
add the received pointer to the one or more respective pointers in the uncompacted portion of the buffer of the root node to produce a plurality of pointers; and
when an amount of data pointed to by the plurality of pointers in the uncompacted portion of the buffer of the root node exceeds a predetermined limit, then:
accessing the data pointed to by the plurality of pointers in the uncompacted portion of the buffer of the root node;
combining the accessed data; and
storing the combined data among one or more compacted packets in the compacted portion of the buffer in the root node, including writing the one or more compacted packets to a data storage device separate from the memory of the apparatus.

12. The apparatus of claim 11, wherein the computer-readable storage medium further comprises instructions for controlling the one or more computer processors to be operable to flush at least one of the one or more compacted packets to a child node of the root node by storing a pointer to at least one of the one or more compacted packets in the root node into an uncompacted portion of a buffer of the child node.

13. The apparatus of claim 12, wherein the one or more computer processors store a pointer to the at least one of the one or more compacted packet in an uncompacted portion of a buffer of the child node without writing the data comprising the compacted packet to the data storage device.

* * * * *